United States Patent
Kynast

(10) Patent No.: US 8,972,643 B2
(45) Date of Patent: Mar. 3, 2015

(54) FIELD BUS NETWORK ADAPTER AND FIELD BUS NETWORK SUBSCRIBER WITH FIELD BUS CONNECTIONS

(71) Applicant: Robert Bosch GmbH, Stuttgart (DE)

(72) Inventor: Rigobert Kynast, Lohr-Wombach (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 13/646,826

(22) Filed: Oct. 8, 2012

(65) Prior Publication Data

US 2013/0091314 A1    Apr. 11, 2013

(30) Foreign Application Priority Data

Oct. 8, 2011    (DE) .......................... 10 2011 115 431

(51) Int. Cl.
*G06F 13/40*    (2006.01)
*H04L 12/437*    (2006.01)

(52) U.S. Cl.
CPC .......... *G06F 13/4004* (2013.01); *H04L 12/437* (2013.01)
USPC ............ 710/307; 710/316; 710/306; 370/364

(58) Field of Classification Search
CPC ............ G06F 13/4022; G06F 13/4027; G06F 13/4045
USPC .......... 710/306, 313–316, 307; 370/362, 364; 713/310
See application file for complete search history.

(56) References Cited

U.S. PATENT DOCUMENTS

| | | | |
|---|---|---|---|
| 7,664,012 B2* | 2/2010 | Cohn | 370/217 |
| 8,001,306 B2* | 8/2011 | Beckhoff et al. | 710/110 |
| 8,291,142 B2* | 10/2012 | Kuschke et al. | 710/105 |
| 8,571,044 B2* | 10/2013 | Ihle et al. | 370/401 |
| 2007/0025240 A1* | 2/2007 | Snide | 370/217 |
| 2011/0208440 A1* | 8/2011 | Pechstein et al. | 702/30 |
| 2013/0103877 A1* | 4/2013 | Burr et al. | 710/315 |

* cited by examiner

*Primary Examiner* — Glenn A Auve
(74) *Attorney, Agent, or Firm* — Maginot, Moore & Beck LLP

(57) ABSTRACT

A field bus network adapter includes a first field bus connection configured to connect a first field bus cable, a second field bus connection configured to connect a second field bus cable, and N number of third field bus connections configured to connect a third cable each. The first field bus connection and the second field bus connection are connected to the N number of third field bus connections such that (i) data received at the first field bus connection are output at a first of the N number of third field bus connections, (ii) data received at an nth of the N number of third field bus connections are output at an (n+1)th of the N number of third field bus connections, and (iii) data received at an Nth of the N number of third field bus connections are output at the second field bus connection.

17 Claims, 5 Drawing Sheets

FIELD BUS NETWORK ADAPTER AND FIELD BUS NETWORK SUBSCRIBER WITH FIELD BUS CONNECTIONS

This application claims priority under 35 U.S.C. §119 to patent application no. DE 10 2011 115 431.4, filed on Oct. 8, 2011 in Germany, the disclosure of which is incorporated herein by reference in its entirety.

BACKGROUND

The present disclosure relates to a field bus network adapter and a field bus network subscriber each provided with a plurality of field bus connections.

The present disclosure lies in the field of field bus networks. Field bus networks are used as industrial networks in order to connect individual components of industrial machines to one another and to an associated control unit which controls the sequences in the machine. Known field buses are, for example, Sercos, Profinet, etc. Typical industrial machines are printing machines, packaging machines, industrial robots, conveyor belts etc.

Systems with real-time capability are being increasingly used in the field of field buses. "Real-time capability" is understood as meaning that the movements of the connected units, for example printing units, robot arms, conveying mechanisms etc., can take place in a defined temporal relationship with respect to one another. This is vital for the operation of particular industrial machines, such as printing machines or robots, in order to ensure, for example, collisions between robot arms or between robot arms and the material, to ensure register accuracy of printing operations etc.

Even though field buses are therefore occasionally set up on known network topologies, for example Ethernet in the case of Sercos III, solutions which are known from conventional network technology (for example in TCP/IP) cannot be readily applied to field buses. Ethernet-based field buses with real-time capability are cited, for example, in the IEC 61784-2 standard.

The systems cabled using field buses are subject to certain demands imposed on operational readiness and response in the event of a fault. For reasons of operational reliability and redundancy, certain field buses use a logical ring structure (one supply line and one return line) or a double-ring structure (two supply lines and two return lines). The supply line and the return line are physically usually accommodated in one cable, which is why the logical double-ring structure is implemented in the form of a physical single-ring structure and the logical ring structure is implemented in the form of a physical line structure. However, a physical star topology is not possible, which makes the cabling relatively complicated overall, in particular if a new network subscriber is intended to be added to an existing field bus network.

In summary, it is relatively complicated to insert new network subscribers into existing networks since a plurality of cables are always required in order to obtain the physical line or ring topology (at least one there and one back). This is undesirable in practice.

Therefore, the object of the disclosure is to specify a possibility which can be used to reduce the cabling complexity in field bus networks with a line or ring topology without making changes to the transmission technology on which the bus is based, with the result that the disclosure can also be implemented, in particular, in existing field bus networks. In particular, the intention is to make it possible to insert a new subscriber into an existing field bus network via a single cable.

SUMMARY

The disclosure proposes a field bus network adapter and a field bus network subscriber having the features described herein.

Within the scope of the disclosure, a field bus network adapter is first of all presented, which adapter also has, in addition to a first and a second conventional field bus connection, a number of N (N=1, 2, 3, . . . ) third field bus connections with special features. The first and second field bus connections are used to incorporate the field bus network adapter in a field bus network in a conventional manner. The first and second field bus connections are used to produce the desired physical line or ring topology, the field bus network adapter being able to be connected to a first adjacent field bus network subscriber via the first field bus connection and being able to be connected to a second adjacent field bus network subscriber via the second field bus connection. These three together form a line. Inside the field bus network adapter, the connections are connected in such a manner that a third adjacent field bus network subscriber connected to one of the N third field bus connections via a single field bus cable is looped into the existing field bus network between the first and second adjacent field bus network subscribers in such a manner that the logical line topology is retained between these two subscribers. In this sense, the single field bus cable from the third adjacent field bus network subscriber to the field bus network adapter is used as a link both to the first adjacent field bus network subscriber and to the second adjacent field bus network subscriber. The splitting between the first and second field bus connections and the field bus cables connected thereto is only carried out in the field bus network adapter.

This is particularly advantageous in Ethernet-based field buses (for example Sercos III), in particular. In this case, two (twisted) cores of conventional 8-core TP cable are respectively used for the supply line and the return line. Two supply lines and two return lines may therefore be routed via the same 8-core TP cable.

Use is preferably made of two field bus network adapters according to the disclosure, between the third field bus connections of which only a single field bus cable runs in order to easily expand existing physical line or ring topologies.

A second aspect of the disclosure presents a field bus network subscriber with a field bus connection which is set up to be directly connected to a field bus network adapter according to the disclosure using a single field bus cable. The field bus connection of the field bus network subscriber according to the disclosure is internally connected to the communication circuit in such a manner that it acts like two conventional field bus connections. Consequently, only one cable needs to be used in order to connect an additional network subscriber to an existing field bus network via the field bus network adapter.

The disclosure simplifies the cabling for field bus networks. Since the latter are used, in particular, in industrial environments where large distances often have to be bridged, the saving of one cable already results in great advantages.

In another preferred refinement, a voltage supply for connected network subscribers is also provided via the one cable. Since conventional field bus network subscribers require relatively high powers, for example 2-3 A at 24 or 42 V, the conventional so-called POE supply does not come into consideration for this purpose. The disclosure proposes supplying the voltage separately from the data transmission, for example via one or two further cores in the field bus cable. On account of the relatively high voltage, it is expedient in this case to use more strongly encapsulated plug-in connections (for example M12), in which the risk of electric shocks etc. is reduced, instead of the otherwise preferred modular plug-in connections (for example RJ45).

The use of a field bus network adapter according to the disclosure makes it possible to define, already early during cabling, branch points inside the field bus network which are only required at a later time. Switchgear cabinets in which network subscribers and the like are mounted are conventionally used in field bus networks. It is now also possible to use field bus network adapters according to the disclosure in such switchgear cabinets in order to provide expansion possibilities. It is also possible to couple two such branch points in different switchgear cabinets without any problems. A field bus network adapter is preferably designed for top-hat rail mounting (for example TS35).

Further advantages and refinements of the disclosure emerge from the description and the accompanying drawing.

The features mentioned above and the features yet to be explained below can be used not only in the respectively stated combination but also in other combinations or alone without departing from the scope of the present disclosure.

The disclosure is schematically illustrated in the drawing using exemplary embodiments and is described in detail below with reference to the drawing.

DETAILED DESCRIPTION

Figure 1:
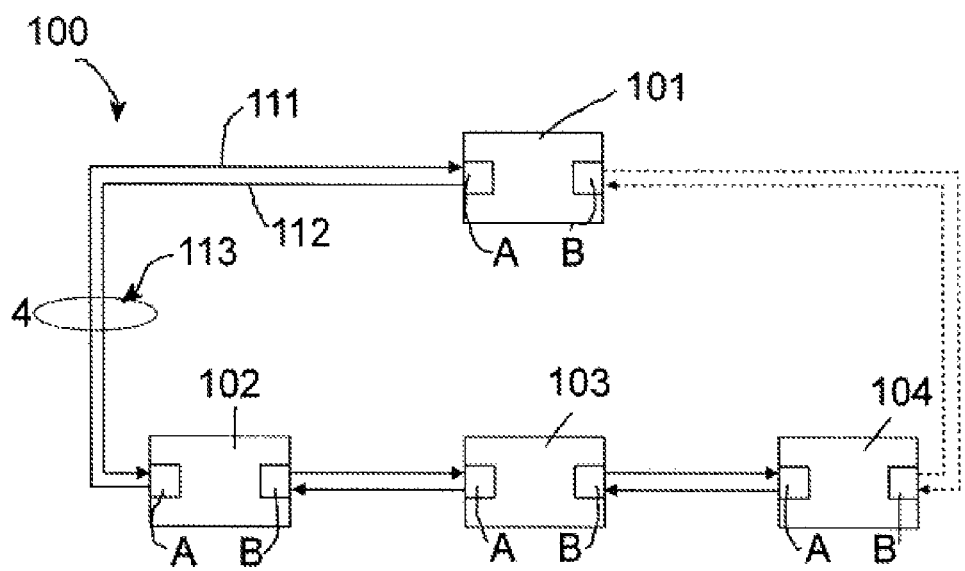
FIG. 1 schematically shows a field bus network on which the disclosure can be based.

A field bus network on which the disclosure can be based is schematically illustrated in FIG. 1 and is denoted 100 as a whole. This is, for example, a Sercos III network based on Ethernet. Such a field bus network is sufficiently well known in the prior art. Such field bus networks are usually used for machine control in industrial environments.

The network 100 has a main subscriber ("master") 101 which controls communication in the network 100. The network also has a number of secondary subscribers ("slave") 102 to 104. The secondary subscribers may be, in particular, actuators or sensors, for example drive controllers etc.

In the network, communication takes place via a first line 111 and a second line 112 which occupy four cores of conventional 8-core TP cables in the case of Sercos III networks in the prior art. The network subscribers each have a first field bus connection A and a second field bus connection B, two adjacent network subscribers always being connected via a field bus cable 113.

In the illustration shown in FIG. 1, there is a physical line topology between the master 101 and the slaves 102, 103, 104, which logically describes a ring topology via the lines 112 (supply) and 111 (return). It is likewise known in the prior art to form a physical ring structure, as is illustrated by the dashed link between the slave 104 and the master 101. The physical ring topology corresponds to a logical double-ring topology with a first ring 111 and a second ring 112.

This linear cabling topology required for Ethernet-based field buses makes it difficult to add new subscribers. If a further network subscriber is intended to be inserted, for example, between the network subscribers 102 and 103 from FIG. 1, a first field bus cable must be routed from the network subscriber 102 to the new subscriber and a second network cable must be routed from the new subscriber to the network subscriber 103 in the prior art. This type of cabling is relatively complicated.

The disclosure makes it possible to reduce the cabling complexity, as described with reference to FIGS. 2-6. The figures are described comprehensively, the same elements being provided with the same reference symbols.

Figure 2:
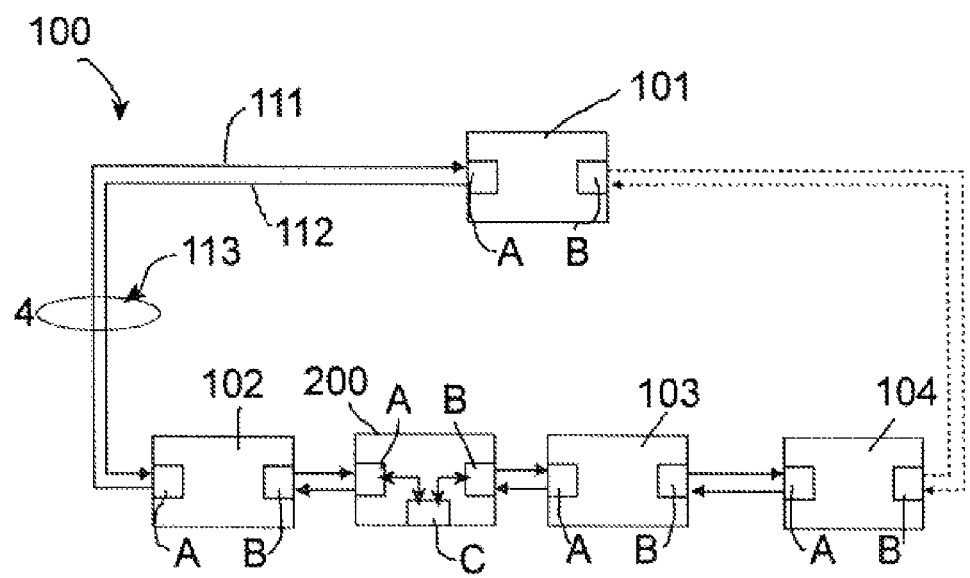
FIG. 2 schematically shows the field bus network from FIG. 1 with a field bus network adapter according to the disclosure.
Figure 5:
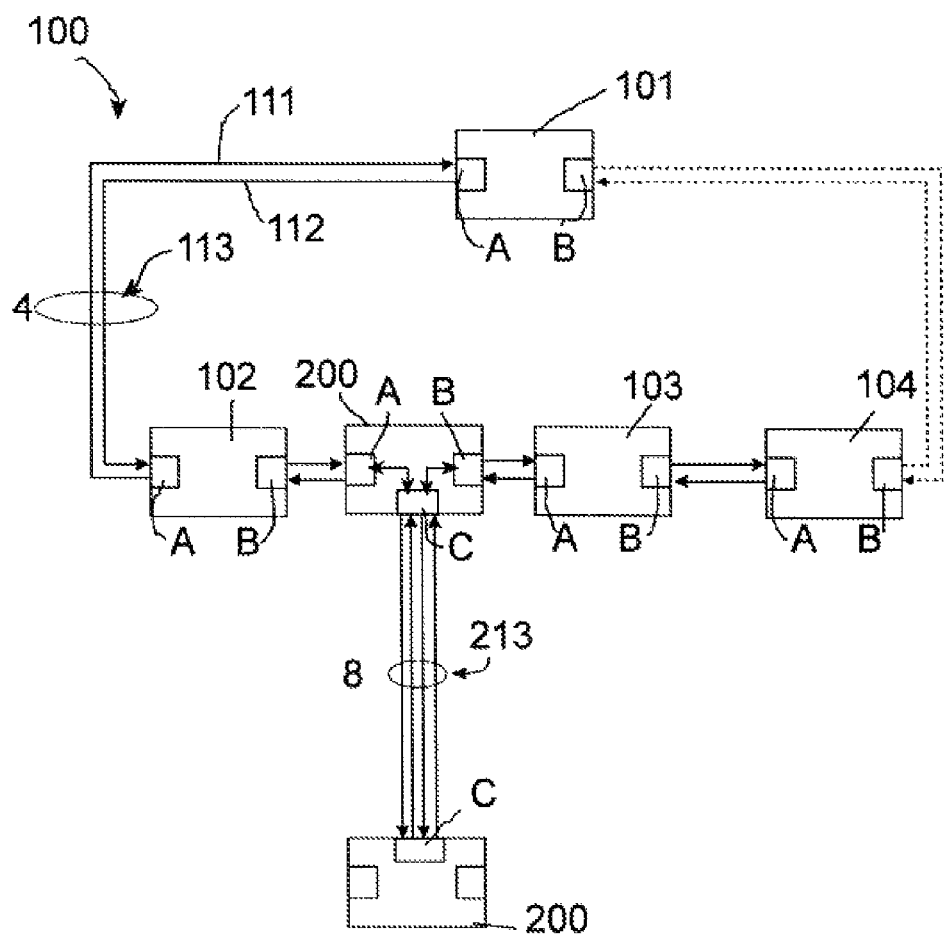
FIG. 5 schematically shows the field bus network from FIG. 1 with two field bus network adapters according to the disclosure which are used to easily expand the field bus network.
Figure 6:
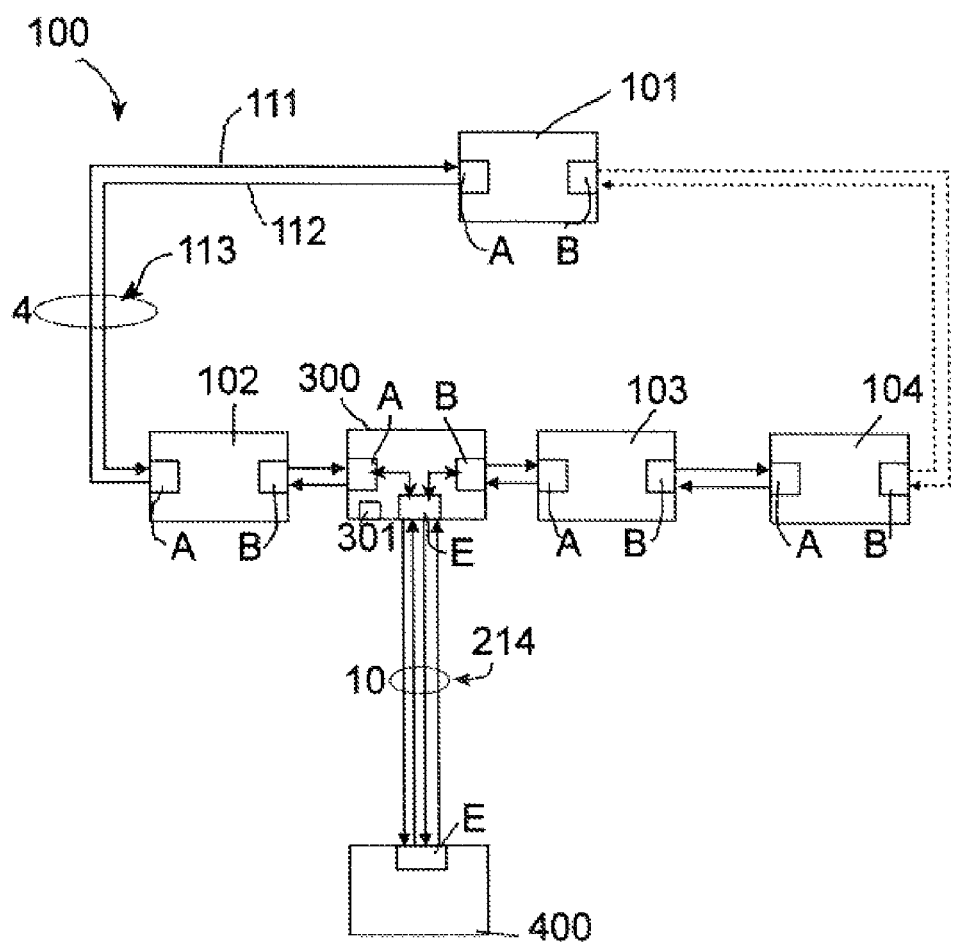
FIG. 6 schematically shows the field bus network from FIG. 1 with a field bus network adapter according to the disclosure and a field bus network subscriber according to the disclosure connected to said adapter in a simple manner.

FIG. 2 illustrates the network 100 from FIG. 1 with a preferred embodiment of a field bus adapter 200 according to the disclosure between the network subscribers 102 and 103. The field bus adapter itself is illustrated in a somewhat more detailed form in FIG. 3. FIG. 4 illustrates a further embodiment of a field bus adapter 300 according to the disclosure. FIG. 5 illustrates how a network can be easily expanded using two field bus adapters 200. FIG. 6 illustrates how a network can be easily expanded using a preferred embodiment of a network subscriber 400 according to the disclosure.

A preferred embodiment of a field bus network adapter 200 according to the disclosure has a first field bus connection A and a second field bus connection B. The field bus network adapter additionally has a third network connection C. The network connections are connected in such a manner that the first field bus connection A is connected to the third field bus connection C and the third field bus connection C is connected to the second field bus connection B. The connection A collaborates, as it were, with one half of the connection C and the connection B collaborates, as it were, with the other half of the connection C. With the cabling which is conventional in Sercos III, for example, the individual supply and return lines are each in the form of TP (twisted pair) lines. In this case, four contacts would be respectively occupied at the connections A and B, whereas 8 contacts would be occupied at the connection C.

If no network subscriber is connected to the connection C, the link is routed from A to B. Automatic switching means 201 are provided for this purpose in a preferred refinement, which switching means directly connect the connection A to the connection B and bridge the connection C if no network subscriber is connected to the connection C. However, if a network subscriber is connected, the latter receives the data from A via C and itself passes the data from C to B, with the result that the connections A and B are connected via the connection C and the network subscriber connected thereto in this case.

Instead of the switching means, a dummy connector D may also be provided in a simple but inexpensive embodiment, which connector ensures that the link is looped through from A to B.

FIG. 4 illustrates another preferred embodiment of a field bus adapter 300 according to the disclosure, which embodiment additionally has a voltage connection 301. The voltage connection 301 is likewise connected to the third field bus connection C, with the result that two further cores are occupied in this case. The voltage connection is used to supply energy to network subscribers at the connection E, as shown in FIG. 6. The voltage supply is, for example, 24 V to 48 V at 2 to 5 amperes. This power cannot be transmitted using conventional POE technology.

FIG. 5 illustrates how a network can be easily expanded using two field bus adapters 200. A single field bus cable 213 having 8 cores is sufficient between the field bus adapters 200.

Figure 3:
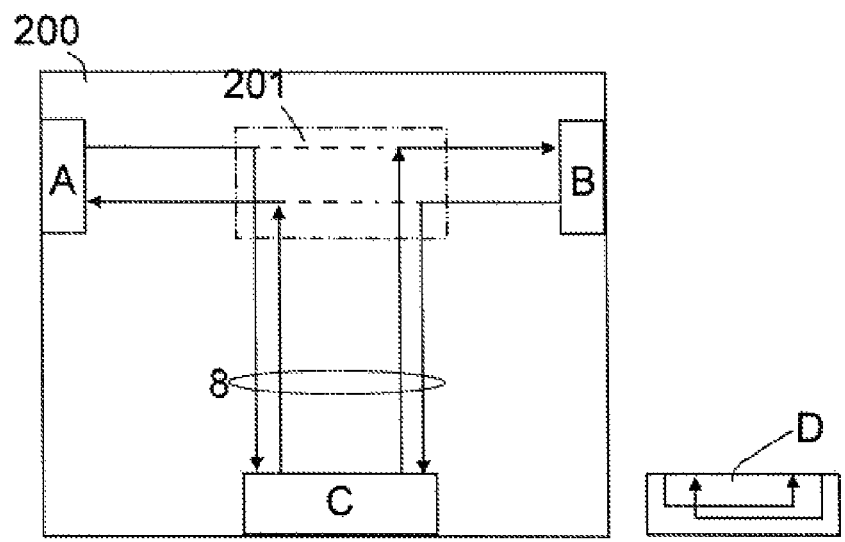
FIG. 3 schematically shows a first preferred embodiment of a field bus network adapter according to the disclosure.
Figure 4:
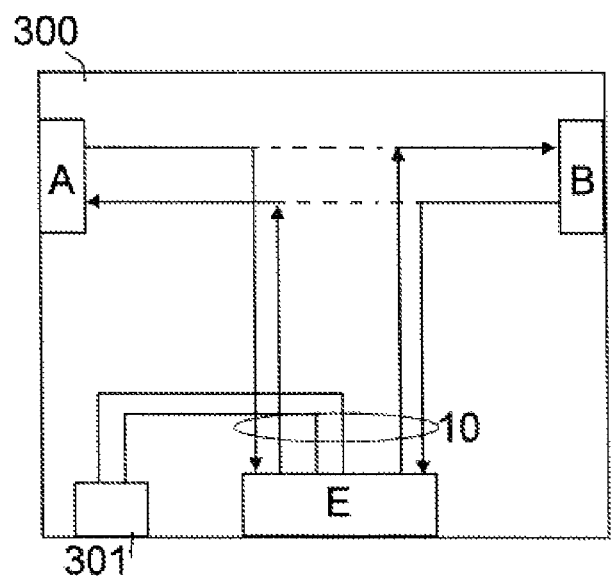
FIG. 4 schematically shows a second preferred embodiment of a field bus network adapter according to the disclosure.

FIG. 6 illustrates a preferred field bus network subscriber which can be connected in a preferred manner to a field bus network adapter 200 according to FIG. 3 or a field bus network adapter 300 according to FIG. 4. In comparison with known field bus network subscribers (with two field bus connections A and B), the network subscriber 400 has only one field bus connection C (without a voltage supply) or E (with a voltage supply), via which both conventional field bus connections and optionally also the voltage supply are routed. Only one field bus cable 213 or 214 having 8 cores or 10 cores must consequently be routed between the field bus adapter and the field bus network subscriber.

Figure 7:
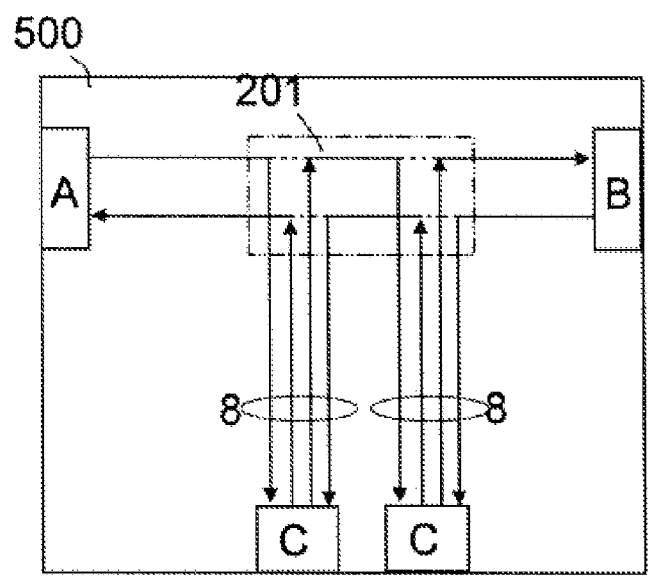
FIG. 7 schematically shows a third preferred embodiment of a field bus network adapter according to the disclosure.

FIG. 7 illustrates a further preferred embodiment of a field bus adapter 500 according to the disclosure, which embodiment has two third field bus connections C. The link runs from the first connection A to the first of the third connections C, runs from there to the second of the third connections C and runs from there to the second connection B. Connections E may alternatively or additionally be provided. Switching means 201 (or dummy connectors) are again provided, which means bridge each connection C (and/or E) if no network subscriber is connected to the latter.

The field bus connections A, B and C are each expediently in the form of an 8-pole modular socket, as is known from TP network technology ("RJ45"). On account of the power to be transmitted, the field bus connection E is expediently more heavily shielded and is in the form of an M12 socket, for example.

Even though only embodiments of field bus network adapters each with two conventional field bus connections and one or two special field bus connections are illustrated in the figures, further embodiments are advantageous. A field bus network adapter according to the disclosure may respectively have any desired number of field bus connections A, B, C, E. The internal connection is disclosed to a person skilled in the art when studying this description.

What is claimed is:

1. A field bus network subscriber comprising:
   a field bus connector configured to connect to a single field bus cable to enable the field bus network subscriber to transmit data to two further field bus network subscribers, and to receive data from the two further field bus network subscribers, the field bus connector comprising:
   a first pair of contacts for a first supply line in the single field bus cable;
   a second pair of contacts for a second supply line in the single field bus cable;
   a third pair of contacts for a first return line in the single field bus cable; and
   a fourth pair of contacts for a fourth return line in the single field bus cable.

2. The field bus network subscriber of claim 1, the field bus connector further comprising:
   a first power contact and a second power contact configured to receive electrical power for the field bus network subscriber from a voltage source through the single field bus cable.

3. The field bus network subscriber according to claim 1, wherein the field bus connector further comprising one of (i) an 8-pole modular socket, and (ii) an M12 socket.

4. An adapter for a field bus network comprising:
   a first field bus connector having a first predetermined number of contacts configured to be connected to a first plurality of cores in a first field bus cable;
   a second field bus connector having a second predetermined number of contacts configured to be connected to a second plurality of cores in a second field bus cable, the second predetermined number of contacts in the second field bus connector being at least twice the first predetermined number of contacts in the first field bus connector;
   a third field bus connector having the first predetermined number of contacts configured to be connected to a third plurality of cores in a third field bus cable; and
   the adapter being configured to:
      connect the first predetermined number of contacts in the first connector to a first portion of the second predetermined number of contacts in the second connector; and
      connect the first predetermined number of contacts in the third connector to a second portion of the second predetermined number of contacts in the second connector.

5. The adapter of claim 4 further comprising:
   a switching device operatively connected to the first connector, the second connector, and the third connector, the switching device being configured to:
   disconnect the first predetermined number of contacts in the first connector from the first portion of the second predetermined number of contacts in the second connector and disconnect the first predetermined number of contacts in the third connector from the second portion of the second predetermined number of contacts in the second connector in response to the second field bus cable being disconnected from the second field bus connector; and
   connect the first predetermined number of contacts in the first connector to the first predetermined number of contacts in the third connector in response to the second field bus cable being disconnected from the second field bus connector.

6. The adapter of claim 4 further comprising:
   a voltage supply; and
   the second predetermined number of contacts in the second connector further comprising:
      a first power contact and a second power contact electrically connected to the voltage supply and configured to connect to a corresponding first core and second core in the second field bus cable to deliver electrical power to a field network device through the second field bus cable.

7. The adapter of claim 4 wherein the adapter connects a first field network device connected to the first field bus cable to a second field network device connected to the second field bus cable.

8. The adapter of claim 7 wherein the adapter connects the second field network device connected to the second field bus cable to a third field network device connected to the third field bus cable.

9. An adapter for a field bus network comprising:
a first field bus connector having a first predetermined number of contacts configured to be connected to a first plurality of cores in a first field bus cable;
a second field bus connector having a second predetermined number of contacts configured to be connected to a second plurality of cores in a second field bus cable, the second predetermined number of contacts in the second field bus connector being at least twice the first predetermined number of contacts in the first field bus connector;
a third field bus connector having the second predetermined number of contacts configured to be connected to a third plurality of cores in a third field bus cable;
a fourth field bus connector having the first predetermined number of contacts configured to be connected to a fourth plurality of cores in a fourth field bus cable; and
the adapter being configured to:
connect the first predetermined number of contacts in the first connector to a first portion of the second predetermined number of contacts in the second connector;
connect a second portion of the second predetermined number of contacts in the second connector to a first portion of the second predetermined number of contacts in the third connector; and
connect a second portion of the second predetermined number of contacts in the third connector to the first predetermined number of contacts in the fourth field bus connector.

10. The adapter of claim 9 further comprising:
a switching device operatively connected to the first connector, the second connector, and the third connector, the switching device being configured to:
disconnect the first predetermined number of contacts in the first connector from the first portion of the second predetermined number of contacts in the second connector and disconnect the first portion of the second predetermined number of contacts in the third connector from the second portion of the second predetermined number of contacts in the second connector in response to the second field bus cable being disconnected from the second field bus connector; and
connect the first predetermined number of contacts in the first connector to the first portion of the second predetermined number of contacts in the third connector in response to the second field bus cable being disconnected from the second field bus connector.

11. The adapter of claim 9 further comprising:
a switching device operatively connected to the second connector, the third connector, and the fourth connector, the switching device being configured to:
disconnect the first predetermined number of contacts in the fourth connector from the second portion of the second predetermined number of contacts in the third connector and disconnect the second portion of the second predetermined number of contacts in the second connector from the first portion of the second predetermined number of contacts in the third connector in response to the third field bus cable being disconnected from the third field bus connector; and
connect the first predetermined number of contacts in the fourth connector to the second portion of the second predetermined number of contacts in the second connector in response to the third field bus cable being disconnected from the third field bus connector.

12. The adapter of claim 9 further comprising:
a switching device operatively connected to the first connector, the second connector, the third connector, and the fourth connector, the switching device being configured to:
disconnect the first predetermined number of contacts in the first connector from the first portion of the second predetermined number of contacts in the second connector and disconnect the first predetermined number of contacts in the fourth connector from the second portion of the second predetermined number of contacts in the third connector in response to the second field bus cable being disconnected from the second field bus connector and the third field bus cable being disconnected from the third field bus connector; and
connect the first predetermined number of contacts in the first connector to the first predetermined number of contacts in the fourth connector in response to the second field bus cable being disconnected from the second field bus connector and the third field bus cable being disconnected from the third field bus connector.

13. The adapter of claim 9 further comprising:
a voltage supply; and
the second predetermined number of contacts in the second connector further comprising:
a first power contact and a second power contact electrically connected to the voltage supply and configured to connect to a corresponding first core and second core in the second field bus cable to deliver electrical power to a field network device through the second field bus cable.

14. The adapter of claim 9 further comprising:
a voltage supply; and
the third predetermined number of contacts in the third connector further comprising:
a first power contact and a second power contact electrically connected to the voltage supply and configured to connect to a corresponding first core and second core in the third field bus cable to deliver electrical power to a field network device through the third field bus cable.

15. The adapter of claim 9 wherein the adapter connects a first field network device connected to the first field bus cable to a second field network device connected to the second field bus cable.

16. The adapter of claim 15 wherein the adapter connects the second field network device connected to the second field bus cable to a third field network device connected to the third field bus cable.

17. The adapter of claim 16 wherein the adapter connects the third field network device connected to the third field bus cable to a fourth field network device connected to the fourth field bus cable.

* * * * *